United States Patent [19]  
Keleshian

[11] 3,909,086  
[45] Sept. 30, 1975

[54] THRUST BEARING ASSEMBLY
[75] Inventor: John V. Keleshian, Elmwood Park, Ill.
[73] Assignee: Aetna Bearing Company, Chicago, Ill.
[22] Filed: Dec. 13, 1973
[21] Appl. No.: 424,291

[52] U.S. Cl. .................. 308/233; 308/135; 192/45
[51] Int. Cl.² ......................................... F16C 19/00
[58] Field of Search .............. 192/45; 308/233, 135

[56] References Cited  
UNITED STATES PATENTS
3,268,279  8/1966  Greby ................................ 308/233
3,390,927  7/1968  Adams ............................... 308/233

Primary Examiner—M. Henson Wood, Jr.
Assistant Examiner—Richard A. Bertsch
Attorney, Agent, or Firm—Olson, Trexler, Wolters, Bushnell & Fosse, Ltd.

[57] ABSTRACT

The embodiment of the invention disclosed herein is directed to a thrust bearing assembly which has a bearing member having spaced apart annular thrust rings with a plurality of bearing elements retained therebetween. The bearing member is secured to a carrier plate which has a forged axially directed annular flange which has formed as an integral part therewith an annular retaining ring. An annular elongated sleeve member of non-metallic material is inserted into said carrier plate through the opening made by forming the forged annular flange portion. The sleeve member has an annular groove formed therein to receive the retaining ring and lock the assembly together.

13 Claims, 6 Drawing Figures

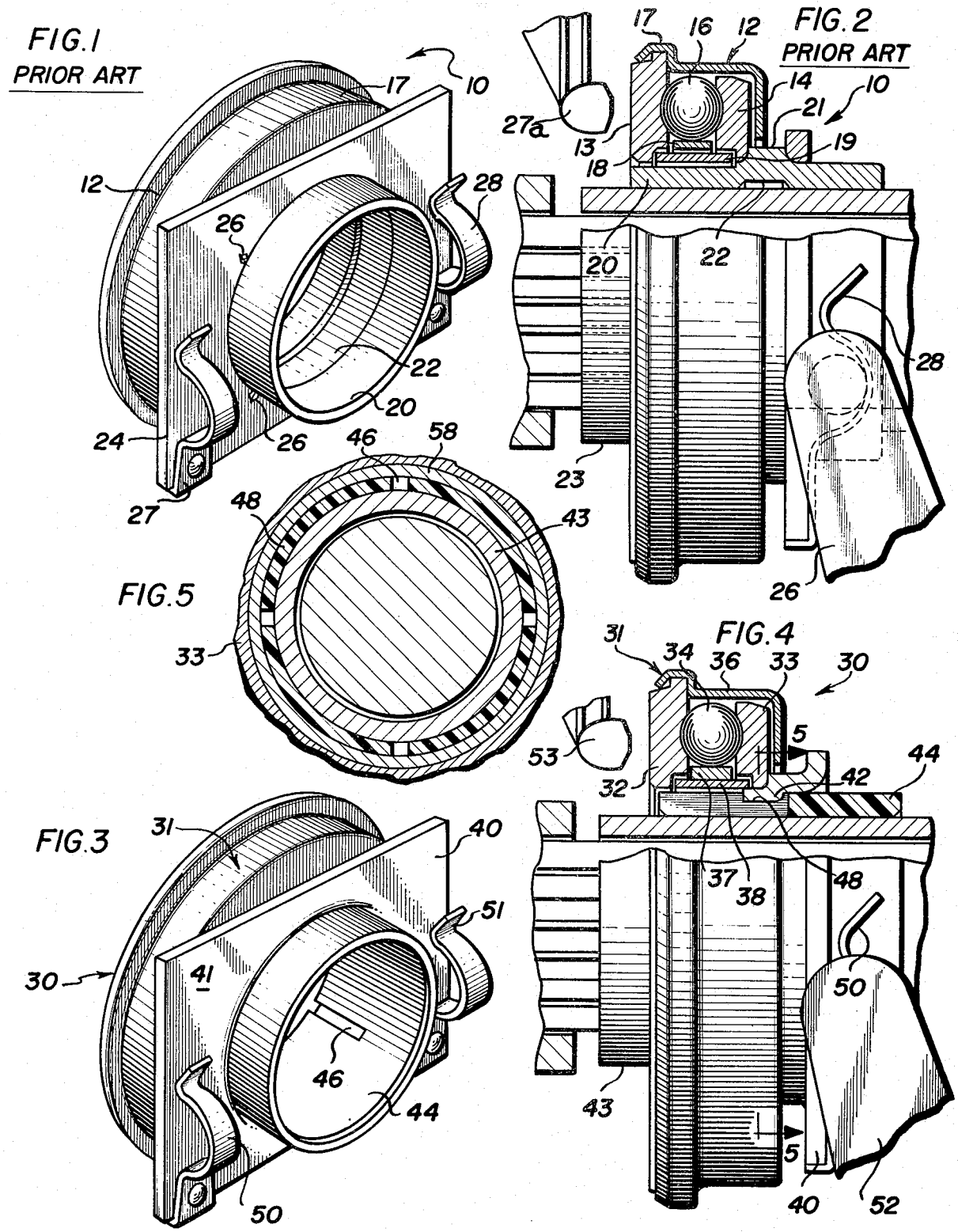

THRUST BEARING ASSEMBLY

BACKGROUND OF THE INVENTION

This invention relates primarily to sealed antifriction thrust bearings used in large numbers in automobiles as clutch release bearings, and more particularly to a new and improved bearing structure which utilizes a forged annular flange for insertion into a bearing member.

Automotive clutch throw-out bearings are well-known in the art and their function is to provide a force transmitting member between the foot-operated clutch pedal and the plurality of rotating clutch release arms associated with the pressure plate on an automotive clutch. These clutch throw-out bearings are subjected to substantial forces and, accordingly, are required to be of superior strength and durability to prevent premature failure. Nevertheless, long periods of continued use of clutch throw-out bearings, under such adverse driving conditions such as stop and go driving, will eventually cause the moving components of the bearings to wear out.

These bearings are used in large quantities and, therefore, large scale manufacturing techniques must be incorporated so as to substantially minimize their cost to the automotive manufacturers. Furthermore, it is desirable to provide a clutch throw-out bearing structure which provides a minimum of axial movement friction between the throw-out bearing and the associated quill upon which it traverses.

Heretofore, clutch throw-out bearings have been manufactured by providing a sealed thrust bearing assembly which has a machine center hub portion staked or otherwise mechanically secured to a carrier plate. This carrier plate is provided with a pair of spaced apart clip members which engage the movable fork arm pivotally operated as the result of movement of the clutch pedal. The longitudinal extent of the machine center hub portion or slide of prior art throw-out art bearing assemblies is of a dimension which requires a machining operation to produce a part of the suitable dimension tolerances and structural strength. Also, it is desirable to provide a clutch throw-out bearing which moves along its axial length of travel with a minimum of friction. Therefore, lubrication means must be provided.

SUMMARY OF THE INVENTION

Accordingly, it is an object of this invention to provide a new and improved bearing assembly which can be used as a clutch throw-out bearing or the like which has reduced friction as a result of axial movement through its length of travel without the use of additional lubrication.

Still another object of this invention is to provide a thrust bearing assembly suitable for use as a clutch throw-out bearing which provides a high degree of reliability and efficiency while being simple and inexpensive to manufacture.

These and many other objects, features and advantages of this invention will be more fully realized and understood from the following detailed description when taken in conjunction with the accompanying drawings wherein like reference numerals of the various views of the drawings are intended to designate similar elements or components.

BRIEF DESCRIPTION OF THE DRAWINGS

FIG. 1 is a perspective view of a clutch throw-out bearing constructed in accordance with the principles of the prior art;

FIG. 2 is a sectional view of the clutch throw-out bearing of FIG. 1 also in accordance with the principles of the prior art;

FIG. 3 is a perspective view of a clutch throw-out bearing constructed in accordance with the principles of this invention;

FIG. 4 is an elevated partially sectional view of the clutch throw-out bearing of FIG. 3 illustrating the details of construction;

FIG. 5 is a sectional view taken along the line 5—5 of FIG. 4; and

DETAILED DESCRIPTION OF THE ILLUSTRATED EMBODIMENT

Figure 6:
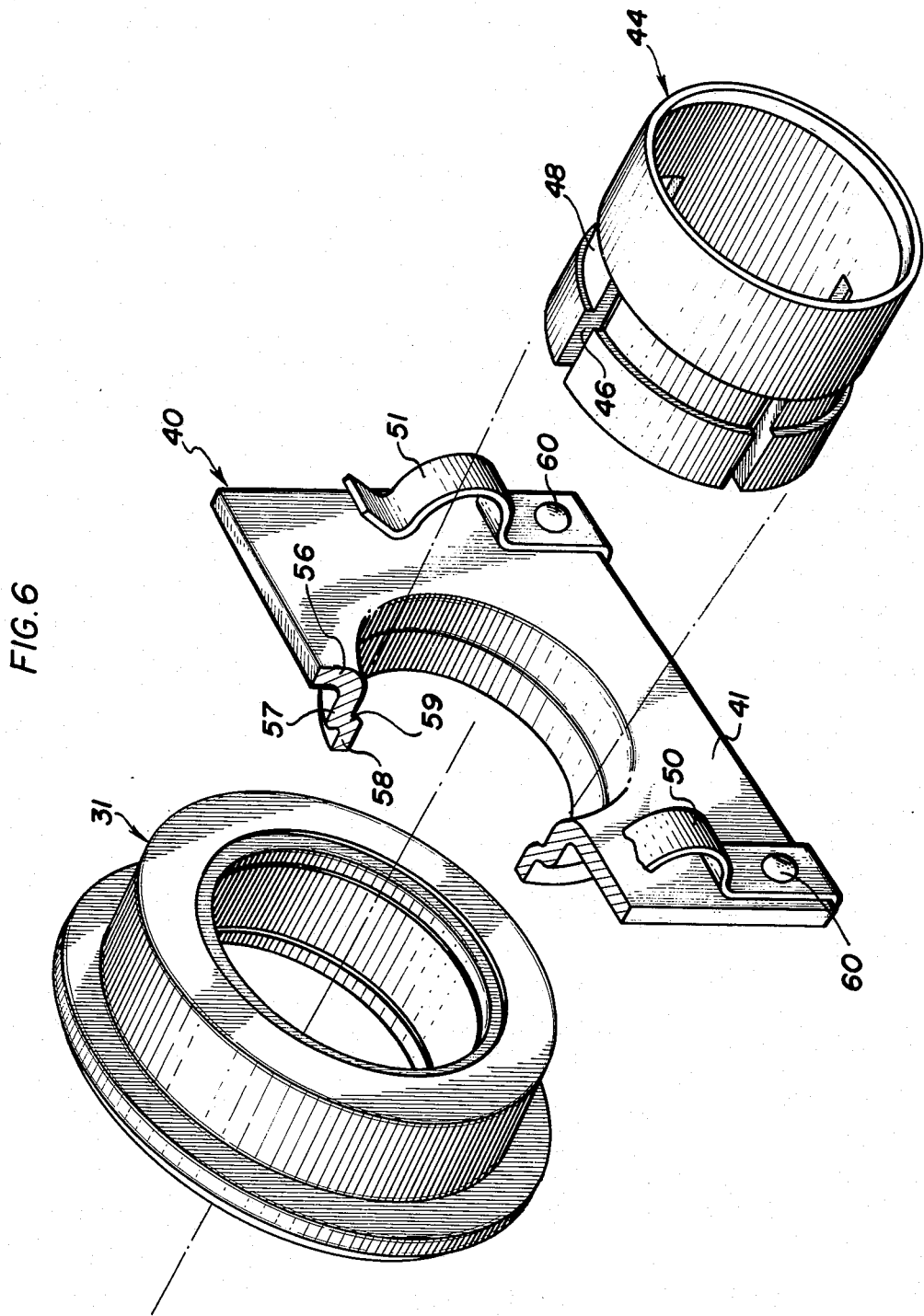
FIG. 6 is an exploded view with portions thereof broken away to clearly illustrate the configuration of the forged carrier plate.

Referring first to FIGS. 1 and 2, there is seen the details of construction of a standard prior art type thrust bearing assembly which is commonly used as a clutch throw-out bearing. Here the thrust bearing assembly is designated generally by reference numeral 10 and includes a bearing member 12 which has a pair of spaced apart annular thrust rings 13 and 14 for retaining a plurality of bearing elements 16 therebetween. The thrust rings 13 and 14 are maintained in an assembled condition by means of a static annular connection 17. A rotary base ring 18 is provided in the usual manner and the pair of thrust rings are rotatable relative to one another as a result of relative rotation of one edge of an inner liner 19 while the other edge thereof is firmly secured to the associated thrust ring.

In accordance with the usual practice of prior art construction, the bearing member 12 is provided with a slide or sleeve member 20 which is formed by a machining operation. This slide member includes an upstanding portion 21 which is to fit into the bearing member as well as a longitudinally disposed portion 22 which fits through the opening of the bearing member. To provide longitudinal stability of operation of the thrust bearing, the axial extent of the slide 20 is in the order of about twice as long as the thrust bearing is wide. An annular groove 22 is provided to receive a quantity of lubricating grease therein so as to minimize friction during axial movement of the slide 20 upon a quill 23 which is a part of the automobile drive shaft coupling assembly.

A carrier plate 24 is permanently secured to the slide member 20 as a result of a staking operation which deforms the metal as indicated by reference numeral 26 at a plurality of spaced apart locations about the slide member 20. By so staking or otherwise permanently securing the carrier plate 24 to the slide 20, a clutch fork assembly 26 can be inserted into a pair of spaced apart clip members 27 and 28 to provide the necessary axial movement of the thrust bearing. Movement of the thrust bearing in the direction of the clutch throw-out plate will cause the open faced portion of the thrust ring 13 to engage a plurality of rotating clutch release arms 27a in the usual well-known manner to displace the pressure plate from the flywheel of the automobile, thereby disengaging the engine from the transmission and differential.

This prior art type of thrust bearing assembly requires that the slide member 20 be a machined part and that the carrier plate 24 be formed as a separate part and staked as indicated by reference numerals 26. While a thrust bearing of this general structure is of sufficient strength and durability, it provides longitudinal friction when moved upon the quill 23 and also is relatively expensive to manufacture, especially in view of todays rising cost of labor.

Referring now to FIGS. 3, 4, 5 and 6, the thrust bearing assembly constructed in accordance with this invention is designated generally by reference numeral 30. As will be apparent from the following description, this bearing assembly will function essentially in the same manner as the prior art, but can be produced and fabricated at a lower cost for material and labor. In this regard, the thrust bearing assembly 30 includes a bearing member 31 having spaced apart annular thrust rings 32 and 33 which provide a chamber for containing a plurality of bearing elements therebetween. Annular retaining means for holding the spaced apart thrust bearing is provided and includes a static annular connecting device 36 and a rotating bearing ring 37 which, in turn, is positioned adjacent an inner liner 38. It can be seen that the construction of the bearing member 30 is substantially the same as that of the bearing member 12 of FIGS. 1 and 2. The retainer means for holding the spaced apart thrust rings are arranged to allow relative rotation of the thrust rings while maintaining their axial spacing in a fixed condition. While ball bearings are illustrated in the embodiment disclosed herein, it will be understood that other bearing means, such as roller bearings or pin bearings may be incorporated in the structure of this invention without departing therefrom.

A carrier plate 40 is provided with a face portion 41 to be positioned transversely of the axis which passes through the bearing member 30, as best seen in FIG. 3. In accordance with this invention the carrier plate 40 has an annular, axially directed flanged portion 42 which is adapted to receive the inner diameter of the bearing member 30. The annular, axially directed flange most advantageously is formed as an integral forged part of the carrier plate and has an axial extent substantially less than the axial extent of the sleeve member 20 of the prior art structure. Therefore, a flange 42 of applicant's structure can be forged with great accuracy and reliability, and at a substantially reduced cost.

To provide a slide surface for the thrust bearing upon the quill 43 an annular elongated sleeve member 44 is used. The sleeve member 44 preferably is made of nonmetallic material, which takes the form of a mineral filled nylon in the embodiment disclosed, and sold under the trade name MINLON. To facilitate insertion of the slide member 44 into the bearing structure, a plurality of spaced apart slots 46 are formed at one edge thereof and, as seen in FIG. 4, extend longitudinally through the slide beyond an annular groove 48 which is formed within the slide member to engage the annular flange 42 for locking the same in position.

The carrier plate 40 has a pair of spaced apart clip members 50 and 51 which are used to engage a fork member 52 in the usual well-known manner to longitudinally move the thrust bearing assembly on the quill 43 so that the thrust ring 32 engages the plurality of rotating clutch release arms 53. This then disengages the clutch plate from the flywheel to disconnect the engine from the transmission and differential.

The mineral filled nylon material which forms the slide member 44 provides substantially reduced frictional contact between the thrust bearing assembly and the quill associated therewith so that a reduced amount of foot pressure is required to disengage the clutch. Furthermore, by utilizing mineral filled nylon as the structural material, the need for a grease groove and a quantity of grease, as seen in FIG. 2 of the prior art structure, is completely eliminated. Also, an improved and less expensive bearing structure is obtained by the present inventor.

As best seen in FIG. 6, the carrier plate 40 has the forged flange portion 42 thereof formed by a first turned longitudinally extended portion 56 which leads into an annular axially directed flange portion 57 which, in turn, is directed into the annular retaining ring portion 58 by means of a turned in portion 59. This structure can be formed by either hot or cold forging with the use of suitable dies as the overall axial length thereof is maintained at a minimum to facilitate the forging operation while being sufficiently long to insure proper structural strength and accurate alignment of assembly.

While the clip members 50 and 51 are here illustrated as being riveted by rivets 60 to the carrier plate 40, it will be understood that they may be fastened thereto by other suitable means such as screws, welding, and the like.

What has been described is an improved and less expensive thrust bearing assembly suitable for use as an automobile or truck clutch throw-out bearing to disengage the clutch member thereof. While a single specific embodiment of the invention has been disclosed with particularity, it will be understood that variations and modifications may be effected without departing from the spirit and scope of the novel concepts disclosed and claimed herein.

The invention is claimed as follows:

1. A thrust bearing assembly comprising in combination: a bearing member having spaced apart annular thrust rings and a plurality of bearing elements rotatably retained therebetween, annular retaining means for holding said spaced apart thrust rings in a fixed axial spaced relation to one another while permitting relative rotation therebetween about a common axis, a carrier plate having a face portion extending transversely of the axis through said bearing member, said carrier plate having an annular, axially directed flanged portion adapted to receive the inner diameter of said bearing member, said annular, axially directed flange portion having formed as an integral part thereof a retaining ring directed radially inwardly thereof, and an annular elongated sleeve member extending into said bearing member and having an annular groove formed therein to receive said retaining ring, whereby said sleeve is held in position as a result of the engagement between said retaining ring and said annular groove.

2. The thrust bearing assembly as set forth in claim 1, wherein said annular, axially directed flange portion is formed as an integral forged part of said carrier plate.

3. The thrust bearing assembly as set forth in claim 1, wherein said annular elongated sleeve member has a plurality of longitudinally directed annularly spaced apart slots to permit inward squeezing at one end portion thereof to facilitate insertion of said sleeve member through said annular, axially directed flange and into said bearing member to permit said retaining ring and said annular groove to come into engagement one with the other.

4. The thrust bearing assembly as set forth in claim 1, wherein said annular elongated sleeve member is formed of nonmetallic material.

5. The thrust bearing assembly as set forth in claim 4, wherein said annular elongated sleeve member is formed of minerally filled nylon.

6. The thrust bearing assembly as set forth in claim 1, wherein said longitudinal slots formed in said sleeve member extend from the end thereof inserted into said annular, axially directed flange and extend longitudinally therethrough an extent which is beyond said annular groove.

7. The thrust bearing assembly as set forth in claim 1, wherein said carrier plate further includes a pair of spaced apart clip means arranged to receive clutch release fork elements to operably move said thrust bearing.

8. The thrust bearing assembly as set forth in claim 1, wherein said carrier plate has said annular, axially directed flange portion formed by a first turned portion leading into an axially directed portion which, in turn, is directed to a second radially inwardly directed turned portion, which then leads into a second axially directed portion which has a diameter less than said first axially directed portion to form said retaining ring.

9. A bearing assembly comprising in combination: bearing means including spaced apart relatively movable members and retaining means for holding said spaced apart member in assembled relation to one another while permitting said relative movement therebetween, a carrier plate having a face portion extending transversely of the axis through said bearing means, said carrier plate having an annular, axially directed flanged portion adapted to receive the inner diameter of said bearing means, said annular axially directed flange portion having formed as an integral part thereof a retaining ring directed radially inwardly thereof; and an annular elongated sleeve member having an annular groove formed therein to receive said retaining ring, whereby said sleeve is held in position radially inward of said bearing means and said carrier plate as a result of the engagement of said retaining ring in said annular groove.

10. A bearing construction comprising in combination a bearing assembly and a mounting arrangement for said bearing assembly adapting said bearing assembly for mounting relative to a shaft or the like, said mounting arrangement comprising a carrier plate having a first flange portion disposed transversely of the axis of said bearing assembly and a second flange portion extending axially of said bearing assembly, with said bearing assembly being mounted on said second flange portion, and an elongate sleeve adapted to receive a shaft or the like having said carrier plate mounted thereon, and means on said carrier plate and said sleeve for fixing the relative position of said carrier plate with respect to said sleeve, said means for fixing the position of said carrier plate with respect to said sleeve comprising radially inward directed protuberant means formed on said second axially directed flange portion, and detent means formed in said sleeve for receiving said radially inward directed protuberant means.

11. A bearing construction as defined in claim 10, wherein said inwardly directed protuberant means comprises an annular ring portion formed integral with said second flange portion, and said detent means in said sleeve comprising an annular groove.

12. A bearing construction according to claim 11, wherein said sleeve is formed of a resilient plastic material, and includes a plurality of axially disposed slots which extend through said annular groove to facilitate an assembly of said sleeve and of said carrier plate.

13. A bearing construction according to claim 10, wherein said sleeve is slotted at a plurality of circumferentially spaced locations to facilitate assembly with said carrier plate.

* * * * *